United States Patent [19]

Berkovich

[11] Patent Number: 5,255,380
[45] Date of Patent: Oct. 19, 1993

[54] COMPUTER SYSTEM WITH DISTRIBUTED RAM MEMORY MODULES DESIGNED FOR CITO TRANSMISSION

[75] Inventor: Semyon Berkovich, Rockville, Md.

[73] Assignee: AlliedSignal Inc., Morris Township, Morris County, N.J.

[21] Appl. No.: 571,338

[22] Filed: Aug. 21, 1990

Related U.S. Application Data

[63] Continuation-in-part of Ser. No. 179,464, Apr. 8, 1988, abandoned.

[51] Int. Cl.$^5$ .................. G06F 13/00; H04J 3/12
[52] U.S. Cl. .................. 395/425; 370/110.4; 370/110.1; 364/DIG. 1; 364/243; 364/238.4; 364/256.8
[58] Field of Search .......... 395/425, 250, 275, 800; 370/110.4, 118, 119, 110.1, 109, 67

[56] References Cited

U.S. PATENT DOCUMENTS

| | | | |
|---|---|---|---|
| 4,493,074 | 1/1985 | Walter et al. | 370/119 |
| 4,598,411 | 7/1986 | Berkovich et al. | 375/27 |
| 4,855,997 | 8/1989 | Wilson et al. | 370/85 |
| 4,868,814 | 9/1989 | Berkovich et al. | 370/67 |
| 4,959,843 | 9/1990 | Park | 375/59 |
| 5,095,481 | 3/1992 | Berkovich | 370/100.1 |
| 5,099,476 | 3/1992 | Berkovich | 370/85.1 |
| 5,146,456 | 9/1992 | Berkovich | 370/110.4 |

Primary Examiner—Paul V. Kulik
Attorney, Agent, or Firm—Howard G. Massung

[57] ABSTRACT

A processing system using a number of distributed memory modules each connected through a sending device to a common serial communication bus. The memory modules each include conventional random access memories (RAMs) and custom designed controllers capable of unloading data encoded in a content induced transaction overlap (CITO) format from the RAM to a the sending device for serial transmission according to a CITO protocol.

4 Claims, 5 Drawing Sheets

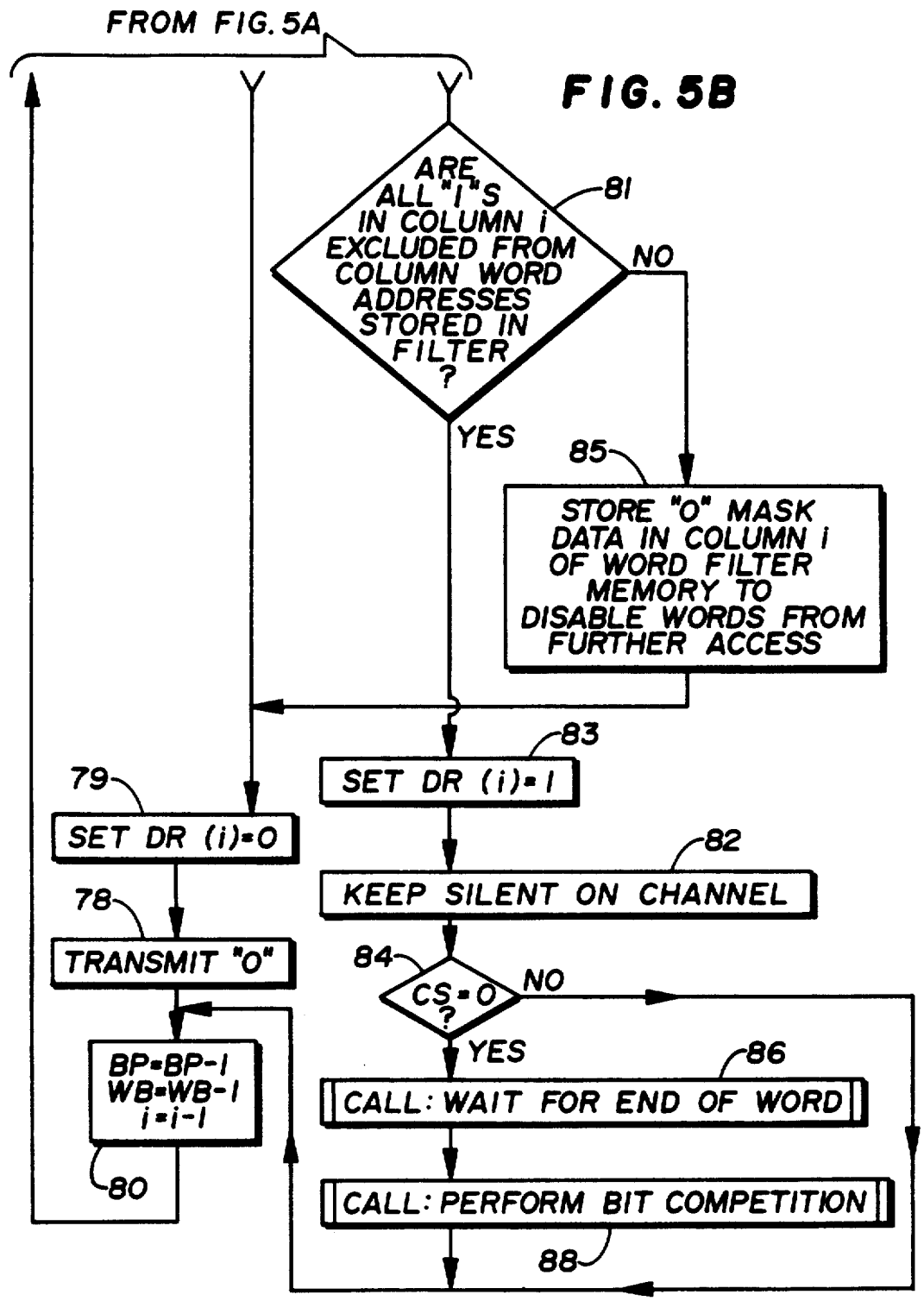

COMPUTER SYSTEM WITH DISTRIBUTED RAM MEMORY MODULES DESIGNED FOR CITO TRANSMISSION

CROSS-REFERENCE TO RELATED APPLICATIONS

This application is a continuation in part of utility patent application Ser. No. 179,464 filed Apr. 8, 1988, now abandoned.

BACKGROUND OF THE INVENTION

1. Field of the Invention

The present invention relates to a multi-processor computer system employing a number of custom RAM memories arranged in an orthogonal layout and accessed by processors in a centralized or decentralized manner, and more particularly to a processing system using distributed (multiple remote) memories each comprising a random access memory (RAM) and controller for operating the RAM according to content induced transaction overlap (CITO) methodology.

2. Description of the Background

Serial communication channels are commonly interconnected to multiple input/output ports which transfer data in accordance with the protocol of the communication channel. The data transferred on the bus is normally determined by the input/output port given access to the bus. Normally, one word or a sequence of words or a sequence of bits of a word may be transferred serially on the bus.

In U.S. Pat. No. 4,493,074, which issued on Jan. 8, 1985 to C. J. Walter, C. R. Wilson, and S. Berkovich, a communication channel was described incorporating a content induced transaction overlap (CITO) protocol. In the '074 patent, the senders simultaneously transmit the highest order bits of their data word one bit at a time serially and monitor the state of the communication channel. Transmission of data bits is terminated by all senders which detect a difference between the state of their transmitted data bit and the state of the communication channel. Bit competition performed at the end of each transmitted data word determines which sender has lexicographically the next smallest word from among those senders still having data bits remaining to be transmitted, the sender then being activated to transmit its remaining data bits. This procedure continues until all of the senders have completed the sending of their data word. In this manner, the sender having the smallest word numerically transmits the word first on the communication channel. All senders are given an opportunity to transmit their word prior to any sender sending a second word.

The '074 patent results in significant data compression because words are simultaneously transmitted from the multiple senders to the extent that their data is redundant, the non-redundant data being transmitted sequentially. Reconstruction of a complete word is subsequently performed by the receiver which appends the higher order bits to subsequently received lower order bits.

Previously, the use of serial communication links to couple distributed memories in computer architectures was limited due to the additional time required to transmit data serially. The serial transmission delay was a problem because the central processor would necessarily supply each address to a conventional memory such as a RAM over a serial communication bus. Certain operations such as search operations were inherently slow because each distributed RAM would cycle through every address, and each address would be sent serially from the processor. The serial data transmission delay is significantly reduced by the '074 patent, which increases the rate of serial communication. If the RAM-accessing time could be minimized, a distributed computer system which utilizes modular memories connected through a serial communication link to a central processor would be a practical system with many advantages. For example, the memory capacity could be expanded or contracted (depending upon the needs of the user) simply by connecting or disconnecting memory modules to/from the serial communications link. Furthermore, although supercomputers may be prohibitively expensive, an equivalent amount of computing power could be realized by a distributed system using numerous interconnected memory modules. The smaller memories could be manufactured at a lower cost in the aggregate.

SUMMARY OF THE INVENTION

It is, therefore, an object of the present invention to interconnect a plurality of RAM memory modules and custom controllers through a plurality of respective senders to a single communication channel which utilizes a content induced transaction overlap (CITO) protocol.

It is another object of the invention to provide a computing system capable of quickly communicating stored data from a number of distributed memory modules to a central receiver.

It is another object of the invention to provide a distributed computer using conventional RAM memories operated by a controller which is customized for use in a CITO communication system.

It is a further object of the invention to provide a custom controller capable of reading the content of data stored in a RAM and providing the bit masking, word masking and data compression necessary to output a CITO encoded result which can be transmitted serially to a central receiver according to CITO protocol.

According to the present invention, the above-described and other objects are accomplished by providing a computer system with a distributed associative memory, the computer system comprising a first serial communication bus, a receiver connected to the first communication bus for receiving serial data, a number of random access memories (RAMs) arranged in an orthogonal layout for storing data words, a corresponding number of controllers each connected to one of the RAMs for sensing the information content of the data words stored therein, and for generating data compressed according to content induced transaction overlap (CITO) format, the compressed data being indicative of the information content, a number of second serial communication links each connected to a corresponding one of the controllers, a number of senders each connected to a corresponding one of the second serial communication links for reading the CITO compressed data, each sender being connected to the first serial communication bus for collective synchronous transmission of the compressed data in accordance with CITO protocol.

BRIEF DESCRIPTION OF THE DRAWINGS

Other objects, features and advantages of the present invention will become more apparent from the following detailed description of preferred embodiments and certain modifications thereof when taken together with the accompanying drawings, in which:

FIGS. 5A and 5B are a flow diagram illustrating the method by which stored data is unloaded and transmitted to a central receiver according to a CITO protocol.

DETAILED DESCRIPTION OF THE PREFERRED EMBODIMENT

Figure 1:
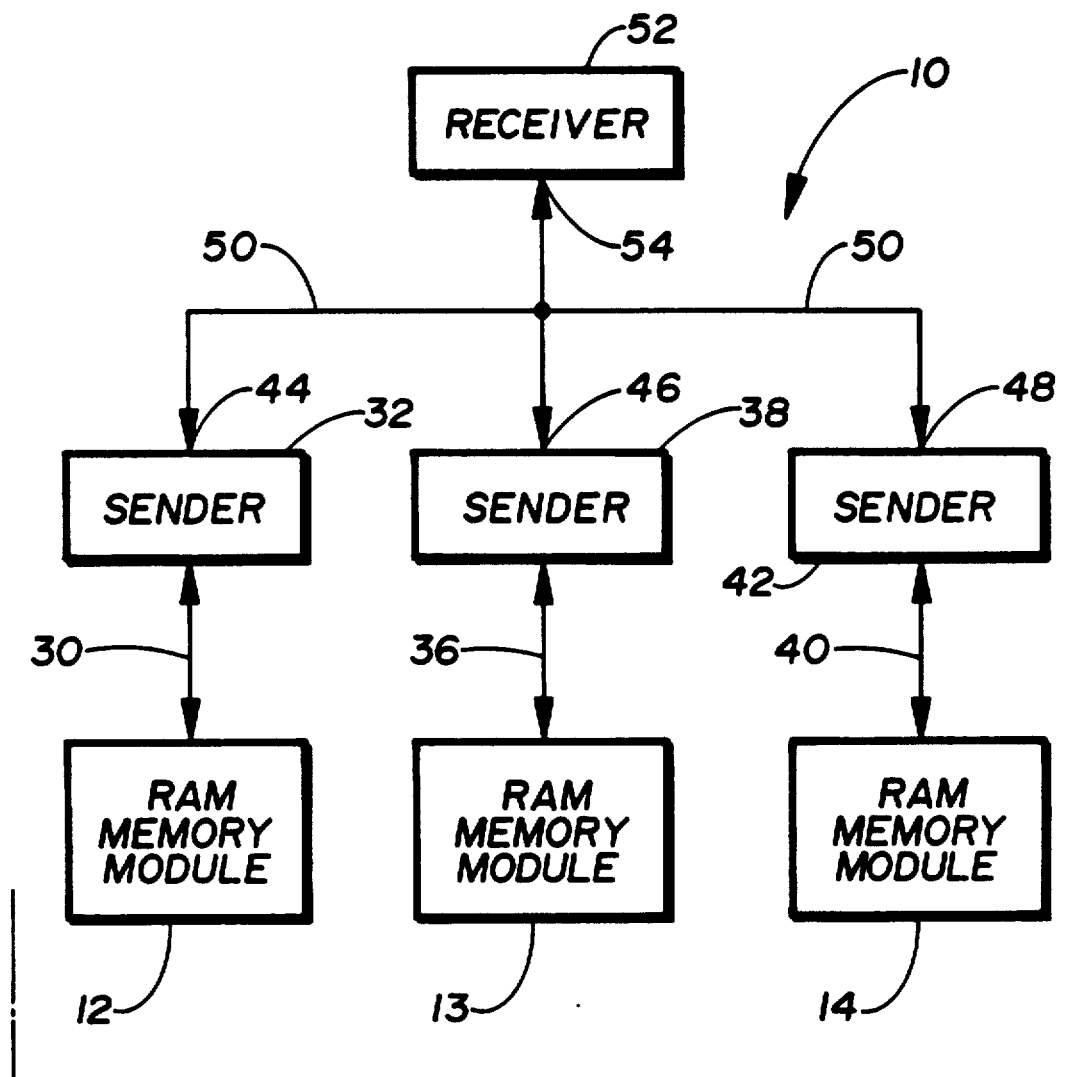
FIG. 1 is a block diagram illustrating a computer system having distributed RAM memory modules according to the present invention.

FIG. 1 shows a computer system having distributed (multiple remote) memory modules 12, 13 and 14 which communicate with a central receiver 52 via a corresponding number of sending devices 32, 38 and 42 transmitting over a common serial communication bus 50.

Memory module 12 is coupled over bi-directional bus 30 to sending device 32. Memory module 13 is coupled over bi-directional bus 36 to sending device 38. Likewise, memory module 14 is coupled over bi-directional bus 40 to sending device 42. Each sending device 32, 38 and 42 has a corresponding bi-directional port 44, 46 and 48 all of which are coupled in common to communication channel 50. Receiver 52 has a bi-directional port 54 which is also coupled to communication channel 50. Sending devices 32, 38 and 42 transmit binary data to one another and to receiver 52 over communication channel 50 in accordance with the content induced transaction overlap (CITO) communication protocol more fully described in U.S. Pat. No. 4,493,074 which issued Jan. 8, 1985 and is incorporated herein by reference.

Figure 2:
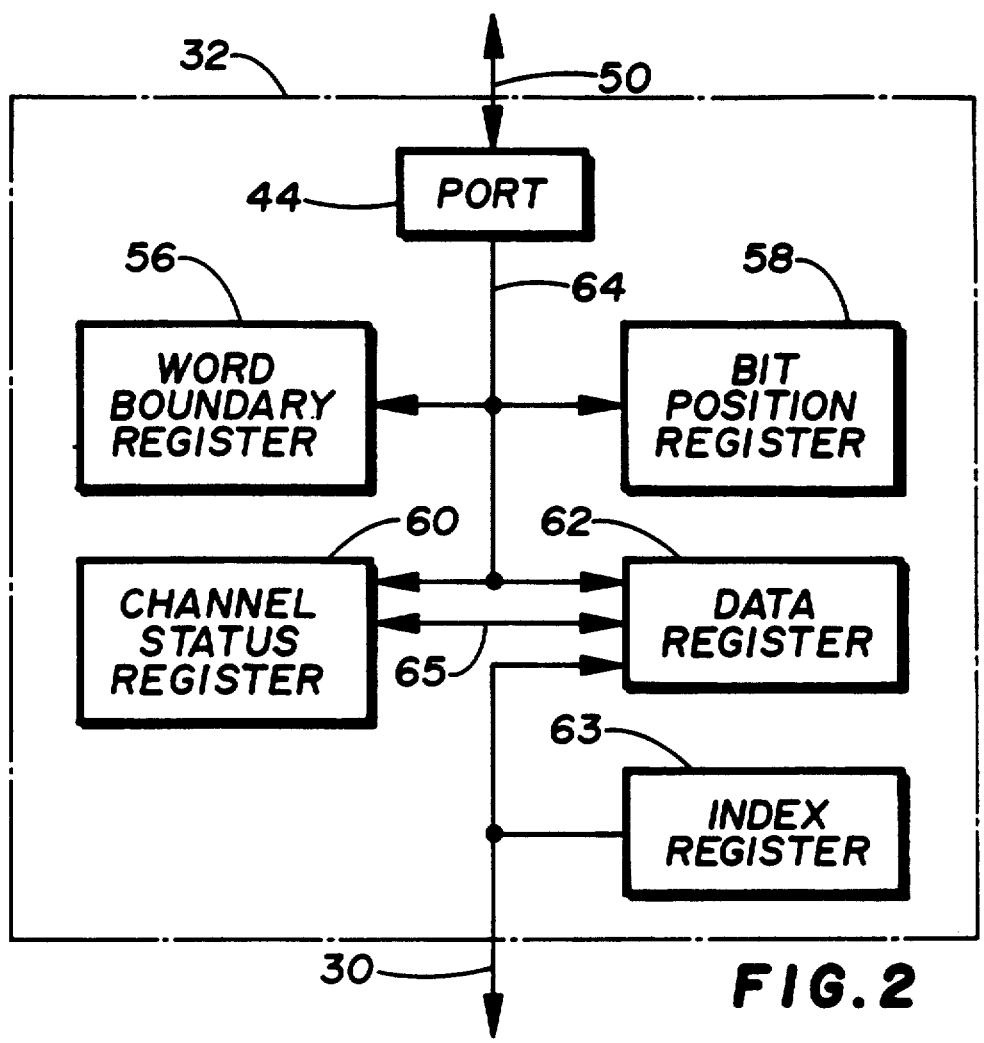
FIG. 2 is a schematic block diagram illustrating the primary components of a sending device used in the computer system of FIG. 1.

FIG. 2 is a schematic block diagram illustrating the primary components of sending device 32 which are identical to those of sending devices 38 and 42. Sending devices 32, 38 and 42 and receiver 52 may contain additional circuitry (not shown) to enable the receiver to reconstruct and receive each data word transmitted on communication channel 50 using the CITO communication protocol. As shown, sending device 32 has a data register 62 for storing a word of data or portion thereof to be transmitted over serial communication bus 50. Sending device 32 has a word boundary register 56 for storing the length (number of bits) of the data word to be transmitted. Sending device 32 also has a bit position register 58 for storing the number of bits in the data word which remain to be transmitted. Sending device 32 has a channel status register 60 for comparing the content of the data register at a particular bit position with the binary level of the communication channel 50. The index register 63 is a pointer which points to the data bit in data register 62 which is to be transmitted next. Index register 63 also points to the corresponding column in memory 68'. In addition, sending device 32 has a port 44 for coupling communication channel 50 to word boundary register 56, bit position register 58, channel status register 60 and data register 62 over lead 64. Bi-directional bus 30 is coupled to an input of data register 62. The operation and function of sending device 32 is the same as described for sending device 10 in U.S. Pat. No. 4,493,074, which issued on Jan. 8, 1985 and is incorporated by reference to describe the operation and function of sending device 32, communication bus 50 and receiver 52.

Figure 3:
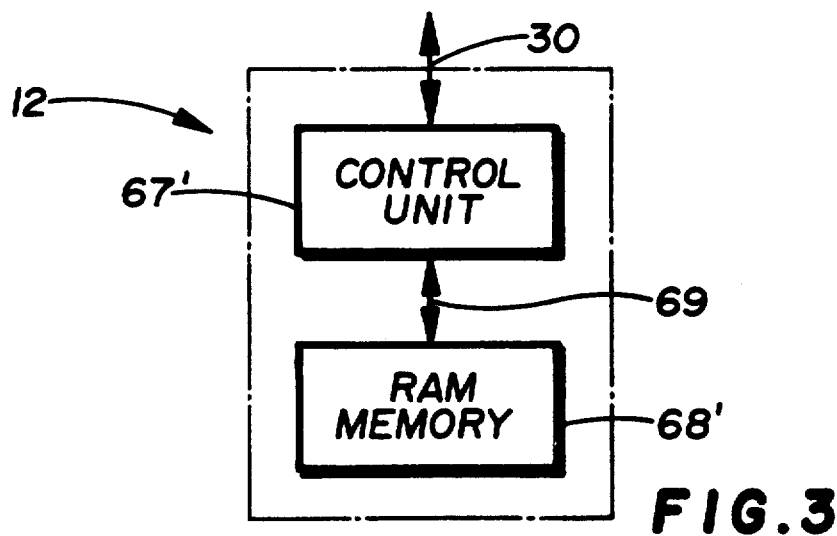
FIG. 3 is a block diagram of the primary components of the RAM memory module according to the present invention.

FIG. 3 is a block diagram of RAM memory module 12. RAM memory module 12 includes a conventional RAM memory 68' connected to a control unit 67' through bi-directional bus 69. Control unit 67' provides orthogonal access to RAM 68' by allowing data to be written in RAM 68' in rows, and data to be read from RAM 68' in columns.

Figure 4:
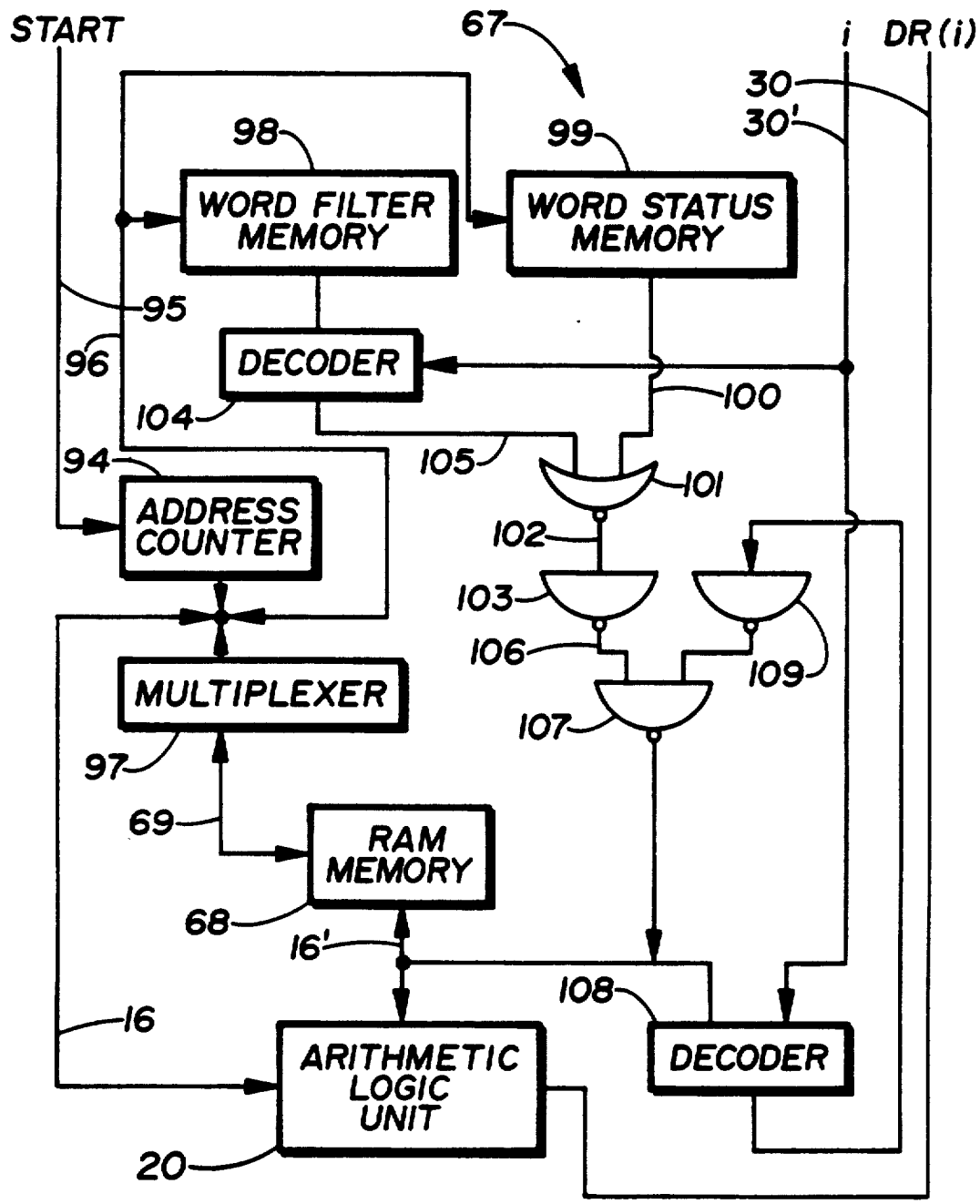
FIG. 4 is a circuit diagram of the RAM memory module of FIG. 3.

FIG. 4 shows a detailed view of the RAM memory module 12 of FIG. 3. The RAM memory module 12 comprises a conventional RAM memory 68 and a control unit 67 for operating the RAM memory 68. The control unit 67 includes an address counter 94 connected to the RAM memory 68 through a multiplexer 97. The address counter 94 is also connected to a word filter memory 98 and word status memory 99 for accessing the contents thereof. Word filter memory 98 contains a number of words of mask data each of which words corresponds to a word of data stored in RAM 68. Word status memory 99 contains a single column of mask data bits each of which bits corresponds to a word of data stored in RAM 68. The output of word filter memory 98 and RAM 68 are coupled through decoders 104 and 108 which gate only the ith bit of a data word read from RAM 68. Word filter memory 98 and word status memory 99 are coupled to NOR gate 101 whereby the $i^{th}$ bit of mask data from word filter memory 98 is NORed with the corresponding bit, from word status memory 99. The output of NOR gate 101 is coupled through invertor 103 to NAND gate 107. The output of RAM 68 is also coupled to NAND gate 107 through decoder 108 and invertor 109. NAND gate 107 functions to NAND the output of invertor 103 with the $i^{th}$ bit of the RAM data word read from RAM 68. The result is input to arithmetic logic unit 20 for processing. Arithmetic logic unit 20 is connected to word filter memory 98 and word status memory 99 in order to write mask data thereto depending on the contents of RAM 68.

In operation, when a START signal is received on line 95 the address counter will begin cycling through all the row addresses of RAM 68. Multiplexer 97 decodes the addresses and accesses each row of data in RAM 68. Each successive data word read from RAM 68 is input to decoder 108. Decoder 108 receives a control signal over line 30' which specifies a particular column within RAM 68. Decoder 108 passes the specified column of data as successive words are read from RAM 68. Each specified bit of each RAM data word is input to NAND gate 107 through invertor 109.

Concurrently with the above, the address counter 94 will access rows of mask data stored in word filter memory 98 and word status memory 99. Word filter memory 98 will output successive mask data words which correspond to the data words read from RAM 68. Likewise, word status memory 99 will output successive mask data bits which correspond to the data words read from RAM 68. Initially, all memory locations in word filter memory 98 and word status memory 99 are written to a logic "1". Word filter memory 98 outputs words of mask data to decoder 104 which functions to pass only the column of data specified on control line 30' as successive words are read from word filter memory 98. Successive bits of mask data read from word filter memory 98 and word status memory 99 are NORed, and the results are input to NAND gate 107 where they are NANDed with the specified bits of RAM data. In effect, gate 107 outputs the bit of RAM data only if it is not masked by either mask memory 98 or 99. The output of gate 107 is connected to arithmetic logic unit 20 which functions to mask all lower order bits in the data word stored in RAM 68 whenever a logic "1" is output from NAND gate 107. This is accomplished by writing logic "0"s into all lower order memory locations in the corresponding word stored in word filter memory 98. The address counter 94 will cycle through all addresses once and RAM 68 will output one column of data (subject to masking by word filter memory 98 and word status memory 99) to arithmetic logic unit 20. Arithmetic logic unit 20 collects the column data and outputs a coded bit of information on line 30 which corresponds to the specified column. The output bit is coded as follows:

"0"—All words have zeros in this column;
"1"—All words have ones in this column;
"X"—This column has some ones and some zeroes;
"Z"—All words are disabled.

The address counter 94 will again cycle through all addresses while RAM 68 outputs a second column of data (subject to masking by word filter memory 98 and word status memory 99). Arithmetic logic unit 20 collects the second column data and outputs a second coded bit of information on line 30. The procedure continues until a complete word of RAM data has been read out in coded form. The output word is masked from further access in RAM 68 by setting the appropriate bit in word status memory to a logic "0".

Figure 5A:
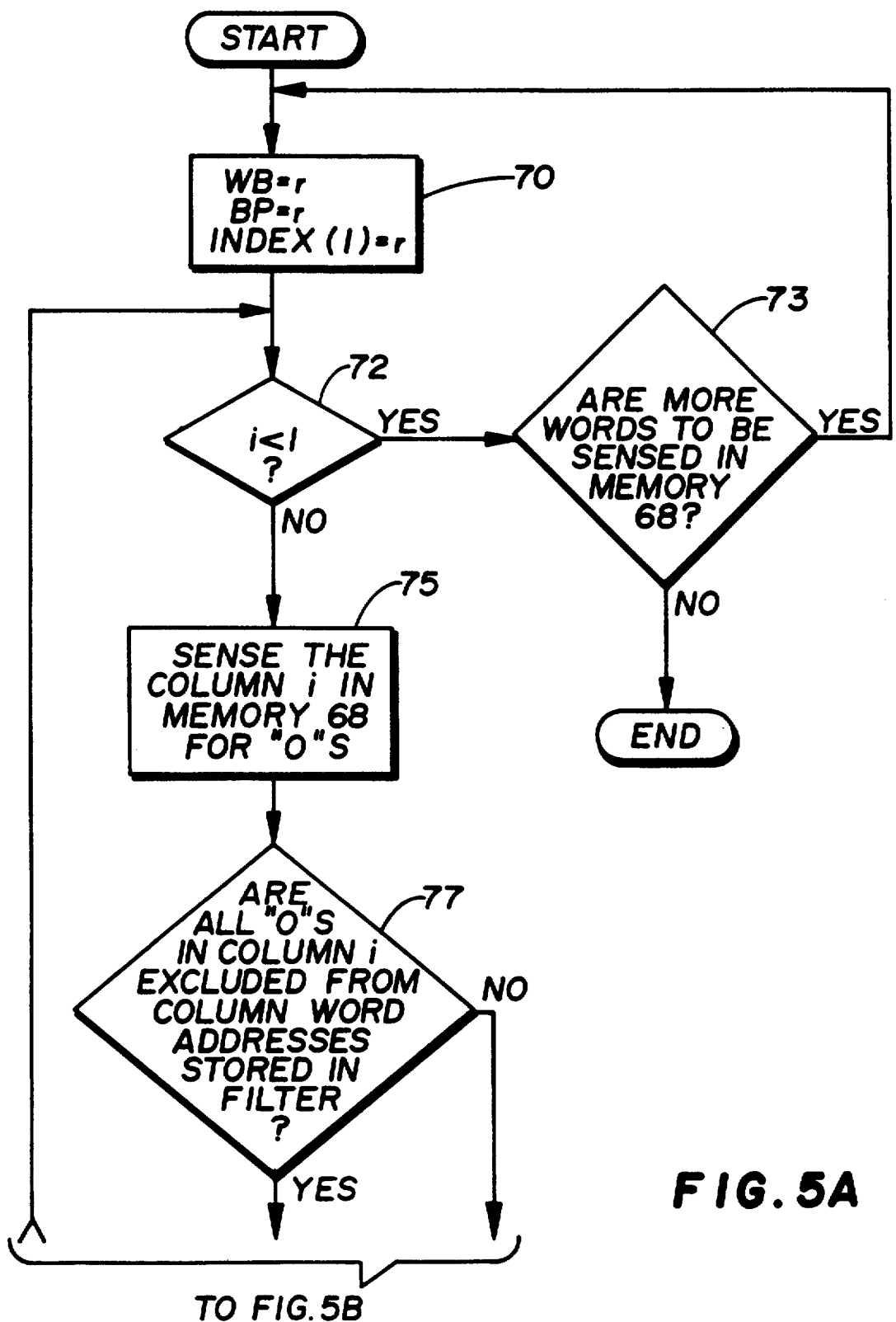

FIGS. 5A and 5B are block diagrams illustrating the method by which data previously stored in RAM memory 68 is downloaded to receiver 52. The method for downloading data will now be explained by reference to the above-described apparatus shown in FIGS. 1-4.

As shown in block 70, the contents "i" of word boundary register 56, bit position register 58, and index register 63 are set equal to "r" which represents the number of bits in each word stored in RAM 68.

In decision block 72, if "i" is not less than "1", the program proceeds to block 75. The procedure in block 75 senses column i in memory 68 for "0"s. This is accomplished by applying a START signal on line 95, which begins address counter 94 cycling through RAM addresses. The data words output from RAM 68 are decoded and masked, and arithmetic logic unit 20 senses the information content of one entire column. Initially, the column containing the highest order bits will be sensed for "0"s since the content of the index register was initialized to "r". This operation is represented by decision block 77.

If arithmetic logic unit 20 determines that all "0"s were sensed in column i of memory 68, the program proceeds directly to procedure block 79. In procedure block 79, the arithmetic logic unit 20 outputs a logic "0" on line 30, which sets the $i^{th}$ bit of the data register 62 equal to "0".

If all "0"s were not sensed in column i of memory 68, then the program proceeds to decision block 81. If a mixture of "1"s and "0"s were sensed in column i of memory 68, then the program proceeds to procedure block 85.

In procedure block 85, arithmetic logic unit 20 stores a logic "0" in word filter memory at the row and column corresponding to the location in RAM 68 where a "1" was sensed, and in all lower order bit positions in that row. This will temporarily mask the lower bit positions from further readout. The program then proceeds to procedure block 79 wherein the $i^{th}$ bit of data register 62 is set equal to "0".

In either of the above cases where the first column contained all "0"s or a mixed bag of "0"s and "1"s, procedure block 78 is executed next and for storage in column i of data register 62 pending serial transmission on communication line 50 according to CITO protocol.

However, if the first column contained all "1"s, then procedure block 82 is executed next and arithmetic logic unit 20 outputs a "1" to line 30 for storage in column i of data register 62. Sending device 32 will transmit nothing on communication line 50 according to CITO protocol. The program proceeds to procedure block 83 wherein the $i^{th}$ bit of data register 62 is set to equal "1". The program moves to decision block 84 which checks the Channel Status (CS) register 60 to determine if another sending device, for example, sending device 38, transmitted a "0". If another sending device has transmitted a "0" sending device 32 executes the "wait for end of word" procedure block 86. Sending device 32 then monitors the channel status register while decrementing the content "WB" of its word boundary register to WB=WB−1 until one of the other sending devices 38 or 42 have finished transmitting a complete word. The program then goes to procedure block 88 in which a bit competition is performed with the remaining sending devices. Reference is herein made to U.S. Pat. No. 4,493,074 which issued on Jan. 8, 1985 to C. J. Walter, C. R. Wilson, and S. Berkovich, which in FIG. 7 shows a flow diagram containing identical blocks 70, 72, 74, 78, 80, 82, 84, 86 and 88, all fully described in the accompanying disclosure and incorporated herein by reference to describe the "wait for end of word" and "bit competition" subroutines. If sending device 32 wins the bit competition indicated by block 88, the program proceeds to block 80 wherein bit position register 58, word boundary register 56 and index register 63 are decremented. The program then returns to decision block 72.

The procedure is repeated from decision block 72, and if the new "i" is not less than "1", the program again proceeds to block 75. The procedure in block 75 senses column i in memory 68 for "0"s. The comparison is represented by decision block 77.

If arithmetic logic unit 20 senses all "0"s in column i of memory 68 (excluding rows which were previously masked), then the program proceeds directly to procedure block 79. In procedure block 79, the $i^{th}$ bit of the data register 62 is set equal to "0".

If all "0"s are not sensed in column i of memory 68 (excluding rows which were previously masked), then the program proceeds to decision block 81. Here, if all "1"s are not sensed in column i of memory 68 (excluding rows previously masked), then there is a mixture of "1"s and "0"s and the program proceeds to procedure block 85.

In procedure block 85, arithmetic logic unit 20 stores a logic "0" in word filter memory at the row and column corresponding to the location in RAM 68 where a "1" was sensed, and in all lower order bit positions in that row. This will mask the words from further readout. The program then proceeds to procedure block 79 wherein the $i^{th}$ bit of data register 62 is set equal to "0".

In either of the above cases where the second column contained all "0"s or a mixed bag of "0"s and "1"s, procedure block 78 is executed and data register 62 transmits another "0" through port 44 and onto serial communication bus 50.

However, if the first column contained all "1"s, then procedure block 82 is executed next and sending device 42 transmits nothing. The contents "BP" of bit position register 58 are then decremented to BP=BP−1, the contents "WB" of word boundary register are decremented to WB=WB−1, and the contents "i" of index register are decremented to i=i−1. If all "1"s are in column i of memory 68, then the program proceeds to procedure block 83 wherein the $i^{th}$ bit of data register 62 is set to equal "1". After the ith bit of data register 62 is set to a logical "1" as provided by procedure block 83, the program proceeds to procedure block 82 wherein sending device 32 keeps silent on communication channel 50 and does not transmit the logical "1" data bit. The program proceeds to decision block 84 which checks the Channel Status (CS) register 60 to determine if another sending device transmitted a "0". If another sending device has transmitted a "0", sending device 32 executes the "wait for end of word" procedure block 86. Sending device 32 then monitors the channel status register while decrementing the content "WB" of its word boundary register to WB=WB−1 until the other sending device has finished transmitting a complete word. The program again goes to procedure block 88 in which a bit competition is performed with the remaining sending devices. If sending device 32 wins the bit competition indicated by block 88, the program proceeds to block 80 wherein bit position register 58, word boundary register 56 and index register 63 are decremented. Then the program again returns to decision block 72.

The above-described procedure will be repeated again and again from procedure block 72 until the value of "i" falls to "0". At this point one word has been completely read out of RAM 68, and the corresponding bit in word status memory 99 will be set to mask further reading of that word. The value of i will be incremented to the column in RAM 68 containing the most significant bit of the next lexicographically smallest data word, and word filter memory 98 will be reset so that words previously masked will be unmasked. The procedure is then repeated from block 72 until the next word is sent, and so on, until the entire contents of RAM 68 have been unloaded.

Eventually, there will be no words left to transmit in any memory module. The CITO procedure results in the sending devices transmitting all of their words in order from the lexicographically smallest to the largest, with redundant "0" bits being transmitted simultaneously to conserve transmission time. The receiver is able to reconstruct the collective data from all memory modules 12-14.

In a different embodiment of the invention (not shown) a processor may be substituted for arithmetic logic unit 20. This would allow the above-described associative computing system to operate from one central processor or from the decentralized processors, thereby allowing a choice of centralized or decentralized computing.

Having now fully set forth the preferred embodiment and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An apparatus for communicating between a plurality of senders and a receiver in accordance with a content induced transaction overlap (CITO) protocol, comprising:
   a first serial communication bus;
   a receiver connected to said first communication bus for receiving serial data transmitted thereon;
   a plurality of senders, each said sender being connected to said first serial communication bus for collective synchronous transmission of data to said receiver, said data being compressed in accordance with a CITO format in accordance with a CITO protocol, each of said senders including:
   a random access memory (RAM) for storing data words to be transmitted by said sender; and
   a controller connected to said RAM for providing orthogonal access thereto, and for sensing an information content of the data words stored therein, said controller further comprising:
   a word filter memory and a word status memory, wherein said word status memory contains a plurality of words of mask bit data each corresponding to a RAM data word, and said word filter memory contains a column of mask bit data where each bit corresponds to a RAM data word;
   a first decoder for selecting a mask bit of said word filter data;
   a second decoder for selecting a bit of said RAM data word;
   a first invertor for inverting said bit selected by said second decoder;
   a NOR gate for NORing said selected mask bit of word filter data with a mask bit of word status data and outputting a result;
   a second invertor for inverting said result from said NOR gate; and
   a NAND gate for NANDing said inverted result from said second invertor with said inverted selected bit of RAM data from said first invertor and for controlling output of said selected bit of RAM data for transmission by said sender, said NAND gate inhibiting output of said selected bit of RAM data if a mask bit of said word filter data or a mask bit of said word status data is present at said NOR gate.

2. The apparatus for communicating according to claim 1, wherein each one of said senders further comprises:
   a serial port for controllably communicating with said receiver in a serial manner over said first serial communication bus;
   a data register connected to said serial port for storing a data word or portion thereof received from said controller for transmission over said first serial communication bus;

a word boundary register connected to said serial port for storing a length of said data word to be transmitted over said first serial communication bus;

a bit position register connected to said serial port for storing a number of bits of said data word which remain to be transmitted;

a channel status register connected to said serial port for comparing a content of a particular bit position in said data register with a binary level of said first serial communication bus; and an index register connected to said data register for pointing to a particular data bit in said data register to be transmitted next, said index register also being connected to said first decoder for pointing to a corresponding column of memory cells in said RAM memory module.

3. A memory module for storing data words and for downloading said stored data words in a CITO encoded format for serial transmission by a sending device according to a CITO protocol, comprising:

a random access memory (RAM) for storing data words to be transmitted by said sending device, said data words being stored in said RAM for access by row and column; and a controller for downloading said stored data words from said RAM to said sending device for transmission, said data words being downloaded in said CITO encoded format wherein the lexicographically smallest of said stored data words is the first data word downloaded to said sending device and subsequent data words are downloaded to said sending device in a lexicographically ascending order, said controller including:

a mask memory for storing mask bits associated with rows and columns of said stored data words;

addressing means connected to said RAM and to said mask memory for accessing sequential rows of said stored data words and corresponding mask bits in said mask memory;

processing means connected to said RAM, said mask memory, and to said sending device for writing mask bits into said mask memory and for outputting information bits of said stored data words to said sending device, said processing means sensing information bits of said stored data words and writing mask bits into said mask memory according to the row and column location of said information bits in said RAM;

first decoding means connected to said mask memory for accessing mask bits stored therein according to the columnar location thereof;

second decoding means connected to said RAM for accessing information bits of said stored data words according to the columnar location thereof; and gate means for controlling output of said sensed information bits from said processing means to said sending device, said gate means receiving mask bits from said first decoding means and information bits from said second decoding means and logically combining said received mask bits and information bits whereby said gate means inhibit transmission by said processing means to said sending device of a particular received information bit if a mask bit and said particular information bit are simultaneously present at said gate means.

4. A memory module as claimed in claim 3 wherein said controller further includes:

a word status memory for storing mask bits corresponding to data words stored in said RAM, said word status memory being connected to said addressing means, said processing means and said gate means, said processing means writing in said word status memory mask bits corresponding to a particular stored data word whenever said particular stored data word has been transmitted in its entirety by said processing means to said sending device, said gate means receiving said mask bits from said word status memory and logically combining said mask bits from said word status memory with said mask bits received from said mask memory and said information bits received from said decoding means whereby said gate means inhibit transmission by said processing means to said sending device of a particular received information bit if a mask bit from said mask memory or a mask bit from said word status memory and said particular information bit are simultaneously present at said gate means.

* * * * *